(12) United States Patent
Garsuch et al.

(10) Patent No.: US 9,093,709 B2
(45) Date of Patent: Jul. 28, 2015

(54) ELECTRODE MATERIALS FOR ELECTRICAL CELLS

(75) Inventors: Arnd Garsuch, Ludwigshafen (DE); Alexander Panchenko, Ludwigshafen (DE); Siegfried Waldvogel, Ingelheim (DE); Birgit Janza, Mainz (DE)

(73) Assignee: BASF SE, Ludwigshafen (DE)

( * ) Notice: Subject to any disclaimer, the term of this patent is extended or adjusted under 35 U.S.C. 154(b) by 446 days.

(21) Appl. No.: 13/489,713

(22) Filed: Jun. 6, 2012

(65) Prior Publication Data

US 2015/0044548 A1   Feb. 12, 2015

(51) Int. Cl.
| | |
|---|---|
| *H01M 6/14* | (2006.01) |
| *H01M 4/60* | (2006.01) |
| *C08G 65/334* | (2006.01) |
| *H01M 10/0568* | (2010.01) |
| *H01M 10/052* | (2010.01) |
| *H02J 7/00* | (2006.01) |
| *B60L 11/18* | (2006.01) |

(52) U.S. Cl.
CPC ........... *H01M 4/604* (2013.01); *B60L 11/1809* (2013.01); *C08G 65/3348* (2013.01); *H01M 10/052* (2013.01); *H01M 10/0568* (2013.01); *H02J 7/0052* (2013.01)

(58) Field of Classification Search
USPC .......................... 429/312, 213, 309, 315, 317
See application file for complete search history.

(56) References Cited

U.S. PATENT DOCUMENTS

| | | | |
|---|---|---|---|
| 3,594,355 | A | 7/1971 | Vandenberg et al. |
| 5,162,175 | A | 11/1992 | Visco et al. |
| 6,403,255 | B1 | 6/2002 | Gofer et al. |
| 2012/0049110 | A1 | 3/2012 | Trukhan et al. |
| 2012/0183854 | A1 | 7/2012 | Garsuch et al. |
| 2012/0251889 | A1 | 10/2012 | Janssen et al. |

(Continued)

FOREIGN PATENT DOCUMENTS

WO   WO 2011/147924 A1   12/2011

OTHER PUBLICATIONS

U.S. Appl. No. 13/965,509, filed Aug. 13, 2013, Panchenko, et al.

(Continued)

*Primary Examiner* — Shane Fang
(74) *Attorney, Agent, or Firm* — Oblon, McClelland, Maier & Neustadt, L.L.P.

(57) ABSTRACT

The present invention relates to electrode materials for electrical cells, containing, as component (A), at least one polymer including polymer chains formed from identical or different monomer units selected from substituted and unsubstituted vinyl units and substituted and unsubstituted $C_2$-$C_{10}$-alkylene glycol units and containing at least one monomer unit -M1- including at least one thiolate group —S$^-$ or at least one end of a disulfide or polysulfide bridge —(S)$_m$— in which m is an integer from 2 to 8, the thiolate group or the one end of the disulfide or polysulfide bridge —(S)$_m$— in each case being bonded directly to a carbon atom of the monomer unit -M1-, and, as component (B), carbon in a polymorph containing at least 60% $sp^2$-hybridized carbon atoms. The present invention also relates to electrical cells containing the inventive electrode material, to specific polymers, to processes for preparation, and to uses of the inventive cells.

15 Claims, 1 Drawing Sheet

(56) References Cited

U.S. PATENT DOCUMENTS

| | | |
|---|---|---|
| 2012/0298926 A1 | 11/2012 | Janssen et al. |
| 2012/0315511 A1 | 12/2012 | Gronwald et al. |
| 2013/0164635 A1 | 6/2013 | Schmidt et al. |

OTHER PUBLICATIONS

U.S. Appl. No. 13/544,332, filed Jul. 9, 2012, Garsuch, et al.

Jiulin Wang, et al., "Sulfur Composite Cathode Materials for Rechargeable Lithium Batteries", Advanced Functional Materials, vol. 13, No. 6, Jun. 2003, pp. 487-492.

Peng Wang, "The Nature of the Interaction Between Polyaniline and 2,5-Dimercapto-1,3,4-thiadiazole in Electrochemical Redox Processes", Journal of the Electrochemical Society, vol. 149, No. 9, 2002, pp. A1171-A1174.

Jiulin Wang, et al., "Electrochemical characteristics of sulfur composite cathode materials in rechargeable lithium batteries", Journal of Power Sources, vol. 138, 2004, pp. 271-273.

Meilin Liu, et al., "Novel Solid Redox Polymerization Electrodes: Electrochemical Properties", J. Electrochem. Soc., vol. 138, No. 7, Jul. 1991, pp. 1896-1901.

M. Okawara, et al., "Chemical Modification of Polyvinyl Chloride and Related Polymers", ACS Symposium Series, American Chemical Society, vol. 121, 1980, pp. 41-57.

M. B. Jackson, et al., Sulfur-Containing Resins From Polyepichlorohydrin for Mercury Adsorption, Reactive Polymers, vol. 8, 1988, pp. 211-220.

Andreas Jess, et al., "Herstellung von Kohlenstoff-Nanotubes und -fasern durch Gasphasenabscheidung", Chemie Ingenieur Technik, vol. 78, No. 1-2, 2006, pp. 94-100.

Petr Novák, et al., "Electrochemically Active Polymers for Rechargeable Batteries", Chemical Reviews, vol. 97, No. 1, 1997, pp. 207-281.

European Search Report issued in European Application No. 12 79 7243, filed Jun. 6, 2012, dated Feb. 18, 2015.

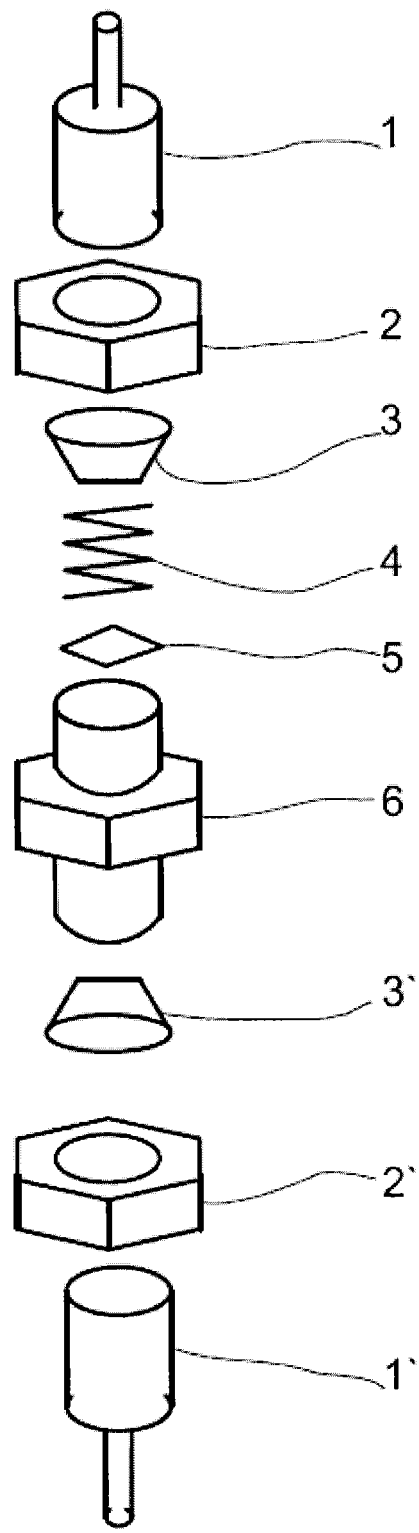

ELECTRODE MATERIALS FOR ELECTRICAL CELLS

The present invention relates to electrode materials for electrical cells, comprising, as component (A), at least one polymer comprising polymer chains which are formed from identical or different monomer units selected from the group consisting of substituted and unsubstituted vinyl units and substituted and unsubstituted $C_2$-$C_{10}$-alkylene glycol units and comprise at least one monomer unit -M1- which comprises at least one thiolate group —$S^-$ or at least one end of a disulfide or polysulfide bridge —$(S)_m$— in which m is an integer from 2 to 8, the thiolate group or the one end of the disulfide or polysulfide bridge —$(S)_m$— in each case being bonded directly to a carbon atom of the monomer unit -M1-, and, as component (B), carbon in a polymorph comprising at least 60% $sp^2$-hybridized carbon atoms. The present invention further relates to electrical cells comprising the inventive electrode material, to specific polymers, to processes for preparation thereof and to the use of the inventive cells.

Secondary batteries or rechargeable batteries are just some embodiments by which electrical energy can be stored after generation and used when required. Owing to the significantly better power density, there has been a departure in recent times from water-based secondary batteries to development of batteries in which the charge transport in the electrical cell is accomplished by lithium ions.

However, the energy density of conventional lithium ion batteries which have a carbon anode and a cathode based on metal oxides is limited. New horizons with regard to energy density have been opened up by lithium-sulfur cells. In lithium-sulfur cells, sulfur in the sulfur cathode is reduced via polysulfide ions to $S^{2-}$, which is reoxidized when the cell is charged to form sulfur-sulfur bonds.

A problem, however, is the solubility of the polysulfides, for example $Li_2S_4$ and $Li_2S_6$, which are soluble in the solvent and can migrate to the anode. The consequences may include: loss of capacitance and deposition of electrically insulating material on the electrode. The migration of the polysulfide ions from the cathode to anode can ultimately lead to discharge of the affected cell and to cell death in the battery. This unwanted migration of polysulfide ions is also referred to as "shuttling", a term which is also used in the context of the present invention.

There are numerous attempts to suppress this shuttling. For example, J. Wang et al. propose adding a reaction product of sulfur and polyacrylonitrile to the cathode; Adv. Funct. Mater. 2003, 13, 487 ff. This forms a product which arises by elimination of hydrogen from polyacrylonitrile with simultaneous formation of hydrogen sulfide.

It has additionally been proposed to use sulfides instead of sulfur, for example CuS, $FeS_2$ or 2,5-dimercapto-1,3,4-thiadiazole. However, the capacity of such cells was unsatisfactory; see, for example, P. Wang, J. Electrochem. Soc. 2002, A1171-1174, 149 and J. Wang et al., J. Power Sources 2004, 138, 271.

The replacement of pure sulfur by polymers comprising disulfide bridges has likewise been proposed. For instance, Liu describes the use of polyorganodisulfides as materials for solid redox polymerization electrodes (M. Liu et. al, J. Electrochem. Soc., 1991, 138, 1896-1901, U.S. Pat. No. 5,162, 175). The electrode is used in rechargeable cells together with polymeric electrolytes. However, high temperatures of 80 to 130° C. are required for the operation of the cell, and the specific capacities achieved are very low.

Modification of Polymers, ACS Symposium Series, vol. 121, 1980, 41-57 describes the reaction of polymers having active chlorine groups, for example polyvinyl chloride or polyepichlorohydrin, with various nucleophiles, for example thiourea, alkali metal thiocyanates or ammonium thiosulfate.

Reactive Polymers, 8, 1988, 211-220 describes the production of resins for the adsorption of mercury(II) ions, by first producing a resin proceeding from low molecular weight polyepichlorohydrin with a molar mass $M_w$ of 1500 g/mol by crosslinking, and then replacing the chlorine groups in the resin with thiol groups.

It was thus an object of the present invention to provide a cathode material which is easy to produce and which avoids the disadvantages known from the prior art. It was a further object of the present invention to provide novel constituents for such cathode materials and processes for preparation thereof.

This object is achieved by an electrode material for an electrical cell, comprising
(A) polymer comprising polymer chains which are formed from identical or different monomer units selected from the group consisting of substituted and unsubstituted vinyl units and substituted and unsubstituted $C_2$-$C_{10}$-alkylene glycol units and comprise at least one monomer unit -M1- which comprises at least one thiolate group —$S^-$ or at least one end of a disulfide or polysulfide bridge —$(S)_m$— in which m is an integer from 2 to 8, the thiolate group or the one end of the disulfide or polysulfide bridge —$(S)_m$— in each case being bonded directly to a carbon atom of the monomer unit -M1-,
(B) carbon in a polymorph comprising at least 60% $sp^2$-hybridized carbon atoms,
(C) optionally elemental sulfur, and
(D) optionally at least one further polymer as a binder material.

BRIEF DESCRIPTION OF THE DRAWINGS

FIG. 1 shows the schematic structure of a dismantled electrochemical cell for testing of inventive electrode materials.

The polymer present in the inventive electrode material comprises polymer chains which are formed from identical or different monomer units selected from the group consisting of substituted and unsubstituted vinyl units and substituted and unsubstituted $C_2$-$C_{10}$-alkylene glycol units and comprise at least one monomer unit -M1- which comprises at least one thiolate group —$S^-$ or at least one end of a disulfide or polysulfide bridge —$(S)_m$— in which m is an integer from 2 to 8, the thiolate group or the one end of the disulfide or polysulfide bridge —$(S)_m$— in each case being bonded directly to a carbon atom of the monomer unit -M1-. In the context of the present invention, this polymer is also called polymer (A) or component (A) for short. Polymer (A) preferably consists to an extent of more than 50% by weight, preferably more than 80% by weight, especially to an extent of more than 95% by weight, of above-described polymer chains comprising at least one monomer unit -M1-.

The polymer chains of the polymer present in the inventive electrode material are formed from identical or different monomer units selected from the group consisting of substituted and unsubstituted vinyl units and substituted and unsubstituted $C_2$-$C_{10}$-alkylene glycol units.

In the case that the polymer chains are formed from different monomer units, the different monomer units may be distributed randomly or incorporated in blocks within a polymer chain, which can be implemented within certain limits by the person skilled in the art by selection of the monomer units and/or the polymerization process. In principle, polymer (A) may also be a mixture of two separately prepared different polymers which are then mixed vigorously, for example with the aid of an extruder, and are generally referred to as polymer blends.

Substituted and unsubstituted vinyl units in polymer chains, or the olefinically unsaturated compounds usable for this purpose in a polymerization, are common knowledge to the person skilled in the art. For example, the vinyl unit —$CH_2$—CHCl— derives from the vinyl chloride monomer, or the vinyl unit —$CH_2$—CHPh- from the styrene monomer.

The person skilled in the art is likewise aware of polymer chains with substituted and unsubstituted $C_2$-$C_{10}$-alkylene glycol units and the monomers typically used for this purpose in a corresponding polymerization. For example, the ethylene glycol unit —$CH_2$—$CH_2$—O— derives from the ethylene oxide monomer, the butylene glycol unit —$CH_2$—$CH_2$—$CH_2$—$CH_2$—O— derives from the tetrahydrofuran monomer, the substituted ethylene glycol unit —$CH_2$—CH ($CH_2$Cl)—O— derives from the epichlorohydrin monomer, and the substituted propylene glycol unit —$CH_2$—C($CH_2$Cl)$_2$—$CH_2$—O-derives from the bis(chloromethyl)oxacyclobutane monomer.

The polymer chains of polymer (A) comprise at least one monomer unit -M1- which comprises at least one thiolate group —$S^-$ or at least one end of a disulfide or polysulfide bridge —$(S)_m$— in which m is an integer from 2 to 8, preferably from 2 to 4, especially 2, the thiolate group or the one end of the disulfide or polysulfide bridge —$(S)_m$— in each case being bonded directly to a carbon atom of the monomer unit -M1-.

The negative charge of the thiolate group —$S^-$ is preferably balanced by a metal cation $Met^+$. In a preferred embodiment, $Met^+$ comprises alkali metal cations, half equivalents of alkaline earth metal dications or a half equivalent of zinc dication, more preferably $Li^+$, $Na^+$, $\frac{1}{2}Mg^{++}$ or $\frac{1}{2}Zn^{++}$, especially $Li^+$.

In a preferred variant, at least 60%, preferably at least 80%, more preferably at least 95 to not more than 100%, of the monomer units from which the polymer chains of polymer (A) are formed correspond to the monomer unit -M1-.

Without restricting the invention further, the monomer unit -M1- can be illustrated by the following examples which derive from vinyl units or $C_2$-$C_{10}$-alkylene glycol units:

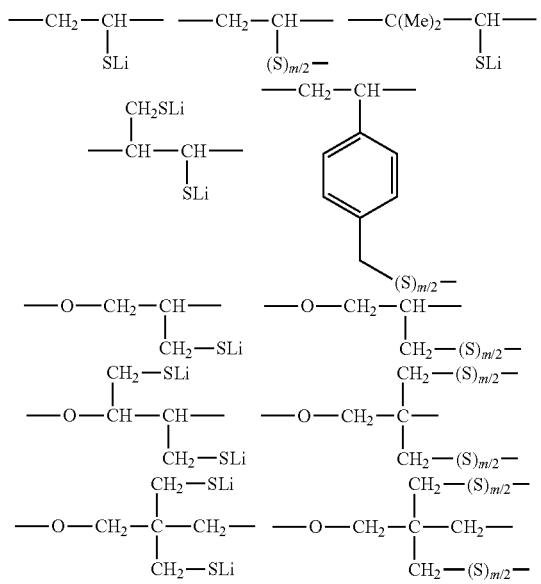

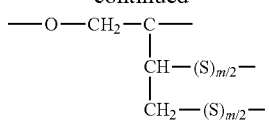

In principle, the monomer units -M1- having a thiolate group could be polymerized directly into the polymer chain by polymerization of the corresponding monomers, in which case the sulfur-containing group in the corresponding monomers would preferably be used in a form capped with a protecting group, which would be removed after the polymerization. Alternatively, proceeding from corresponding polymers bearing suitable leaving groups, for example halogen atoms, it is possible by substitution with suitable sulfur nucleophiles known to those skilled in the art and possibly subsequent reactions to obtain the monomer units -M1- on an existing polymer chain.

Monomers which can be converted to polymers and whose halogen atoms can be converted to the monomer units -M1- by subsequent reactions of the finished polymer in what are called polymer-analogous reactions are, for example:

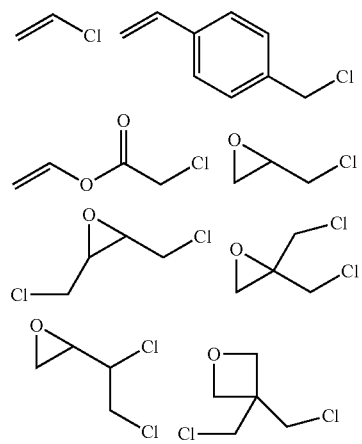

Such polymer-analogous conversions to sulfur-containing polymers are known, for example, from the literature cited at the outset Modification of Polymers, ACS Symposium Series, Vol. 121, 1980, 41-57 and Reactive Polymers, 8, 1988, 211-220.

In a preferred embodiment, a feature of the inventive electrode material is that the monomer unit -M1- in the polymer chains of polymer (A) is a substituted vinyl unit of the formula (I) and/or of the formula (II)

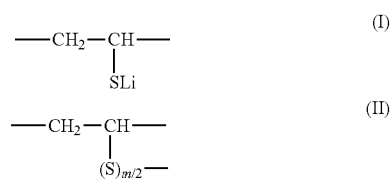

or a substituted ethylene glycol unit of the formula (III) and/or of the formula (IV)

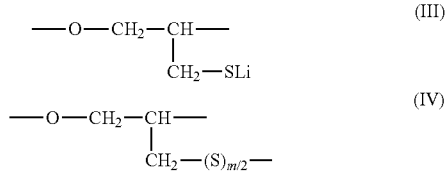

(III)

(IV)

more preferably a substituted ethylene glycol unit of the formula (III) and/or of the formula (IV).

In one embodiment of the present invention, in the electrode material, the second end of the di- or polysulfide bridge —$(S)_m$— is part of a further monomer unit -M1- which is present either in the same polymer chain as the first monomer unit -M1- or in a further polymer chain of polymer (A). When the di- or polysulfide bridges —$(S)_m$— are formed between different polymer chains, what is formed is a polymer crosslinked via di- or polysulfide bridges —$(S)_m$—, such crosslinked polymers generally being insoluble, whereas the corresponding individual isolated polymer chains are generally soluble in suitable solvents.

The inventive electrode material for an electrical cell further comprises carbon in a polymorph comprising at least 60% $sp^2$-hybridized carbon atoms, preferably from 75% to 100% $sp^2$-hybridized carbon atoms. In the context of the present invention, this carbon is also called carbon (B) or component (B) for short, and is known as such. The carbon (B) is an electrically conductive polymorph of carbon. Carbon (B) can be selected, for example, from graphite, carbon black, carbon nanotubes, graphene or mixtures of at least two of the aforementioned substances.

Figures in % are based on all of the carbon (B) present in the electrode material together with polymer (A), including any impurities, and denote percent by weight.

In one embodiment of the present invention, carbon (B) is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, carbon (B) is partially oxidized carbon black.

In one embodiment of the present invention, carbon (B) comprises carbon nanotubes. Carbon nanotubes (CNTs for short), for example single-wall carbon nanotubes (SW CNTs) and preferably multiwall carbon nanotubes (MW CNTs), are known per se. A process for preparation thereof and some properties are described, for example, by A. Jess et al. in Chemie Ingenieur Technik 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon compounds in a light arc, specifically in the presence or absence of a decomposition catalyst.

In one embodiment, the decomposition of volatile carbon compound(s) is performed in the presence of a decomposition catalyst, for example Fe, Co or preferably Ni.

In the context of the present invention, graphene is understood to mean almost ideally or ideally two-dimensional hexagonal carbon crystals of analogous structure to single graphite layers.

In a preferred embodiment of the present invention, carbon (B) is selected from graphite, graphene, activated carbon and especially carbon black.

Carbon (B) may, for example, be in the form of particles having a diameter in the range from 0.1 to 100 μm, preferably 2 to 20 μm. The particle diameter is understood to mean the mean diameter of the secondary particles, determined as the volume average.

In one embodiment of the present invention, carbon (B) and especially carbon black has a BET surface area in the range from 20 to 1500 $m^2/g$, measured to ISO 9277.

In one embodiment of the present invention, at least two, for example two or three, different kinds of carbon (B) are mixed. Different kinds of carbon (B) may differ, for example, with regard to particle diameter or BET surface area or extent of contamination.

In one embodiment of the present invention, the carbon (B) selected is a combination of two different carbon blacks.

In addition, the inventive electrode material for an electrical cell optionally comprises elemental sulfur as well as polymer (A) and carbon (B). Elemental sulfur, also known in the context of the present invention as sulfur (C) or component (C) for short, is known as such.

In a preferred embodiment, the inventive electrode material comprises sulfur (C). In a particularly preferred embodiment, in the inventive electrode material, the mass ratio between polymer (A) and the elemental sulfur (C) is in the range from 1:100 to 100:1, preferably 1:10 to 10:1, especially 1:2 to 2:1.

In one embodiment of the present invention, inventive electrode material comprises in the range from 20 to 80% by weight, preferably 30 to 70% by weight, of sulfur, determined by elemental analysis, the sulfur originating both from component (A) and component (C).

In one embodiment of the present invention, inventive electrode material comprises in the range from 0.1 to 40% by weight of carbon (B), preferably 1 to 30% by weight. This carbon can likewise be determined by elemental analysis, for example, in which case the evaluation of the elemental analysis has to take into account the fact that carbon is also introduced into inventive electrode material via polymer (A), and possibly further sources.

In addition, the inventive electrode material for an electrical cell optionally comprises, as well as polymer (A) and carbon (B), at least one further polymer as a binder, which is also referred to in the context of the present invention as binder (D) for short. Binder (D) serves principally for mechanical stabilization of inventive electrode material.

In one embodiment of the present invention, binder (D) is selected from organic (co)polymers. Examples of suitable organic (co)polymers may be halogenated or halogen-free.

Examples are polyethylene oxide (PEO), cellulose, carboxymethylcellulose, polyvinyl alcohol, polyethylene, polypropylene, polytetrafluoroethylene, polyacrylonitrile-methyl methacrylate copolymers, styrene-butadiene copolymers, tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers, ethylene-chlorofluoroethylene copolymers, ethylene-acrylic acid copolymers, optionally at least partially neutralized with alkali metal salt or ammonia, ethylene-methacrylic acid copolymers, optionally at least partially neutralized with alkali metal salt or ammonia, ethylene-(meth)acrylic ester copolymers, polyimides and polyisobutene.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

The mean molecular weight $M_w$ of binder (D) may be selected within wide limits, suitable examples being 20 000 g/mol to 1 000 000 g/mol.

In one embodiment of the present invention, the inventive electrode material comprises in the range from 0.1 to 10% by weight of binder, preferably 1 to 8% by weight and more preferably 3 to 6% by weight, based on the total mass of components (A), (B), (C) and (D).

Binder (D) can be incorporated into inventive electrode material by various processes. For example, it is possible to dissolve soluble binders (D) such as polyvinyl alcohol in a suitable solvent or solvent mixture, water/isopropanol for example being suitable for polyvinyl alcohol, and to prepare a suspension with the further constituents of the electrode material. After application to a suitable substrate, the solvent or solvent mixture is removed, for example evaporated, to obtain an electrode composed of the inventive electrode material. A suitable solvent for polyvinylidene fluoride is NMP.

If it is desired to use sparingly soluble polymers as the binder (D), for example polytetrafluoroethylene or tetrafluoroethylene-hexafluoropropylene copolymers, a suspension of particles of the binder (D) in question and of the further constituents of the electrode material is prepared, and processed as described above to give an electrode.

Inventive electrode materials are particularly suitable as or for production of electrodes, especially for production of electrodes of lithium-containing batteries. The present invention provides for the use of inventive electrode materials as or for production of electrodes for electrical cells. The present invention further provides electrical cells comprising at least one electrode which has been produced from or using at least one inventive electrode material.

In one embodiment of the present invention, the electrode in question is the cathode. In the context of the present invention, the electrode referred to as the cathode is that which has reducing action on discharge (operation).

In one embodiment of the present invention, inventive electrode material is processed to give electrodes, for example in the form of continuous belts which are processed by the battery manufacturer.

Electrodes produced from inventive electrode material may, for example, have thicknesses in the range from 20 to 500 µm, preferably 40 to 200 µm. They may, for example, have a rod-shaped configuration, or be configured in the form of round, elliptical or square columns or in cuboidal form, or as flat electrodes.

In one embodiment of the present invention, inventive electrical cells comprise, as well as inventive electrode material, at least one electrode comprising metallic magnesium, metallic aluminum, metallic zinc, metallic sodium or preferably metallic lithium.

In a further embodiment of the present invention, above-described inventive electrical cells comprise, as well as inventive electrode material, a liquid electrolyte comprising a lithium-containing conductive salt.

In one embodiment of the present invention, inventive electrical cells comprise, in addition to inventive electrode material and a further electrode, especially an electrode comprising metallic lithium, at least one nonaqueous solvent which may be liquid or solid at room temperature, and is preferably liquid at room temperature, and which is preferably selected from polymers, cyclic and noncyclic ethers, cyclic and noncyclic acetals, cyclic and noncyclic organic carbonates and ionic liquids.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (X) and (XI)

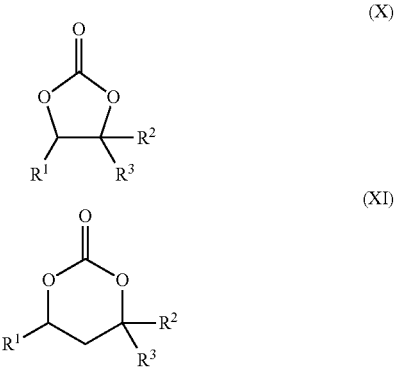

in which $R^1$, $R^2$ and $R^3$ may be the same or different and are selected from hydrogen and $C_1$-$C_4$-alkyl, for example methyl, ethyl, n-propyl, isopropyl, n-butyl, isobutyl, sec-butyl and tert-butyl, where $R^2$ and $R^3$ are preferably not both tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (XII).

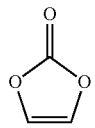
(XII)

The solvent(s) is (are) preferably used in what is known as the anhydrous state, i.e. with a water content in the range from 1 ppm to 0.1% by weight, determinable, for example, by Karl Fischer titration.

In one embodiment of the present invention, inventive electrochemical cells comprise one or more conductive salts, preference being given to lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_mXLi$, where m is defined as follows:

m=1 when X is selected from oxygen and sulfur,
m=2 when X is selected from nitrogen and phosphorus, and
m=3 when X is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium and toward lithium sulfides and lithium polysulfides. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, the separators selected may be separators made from PET nonwovens filled with inorganic particles. Such separators may have a porosity in the range from 40 to 55%. Suitable pore diameters are, for example, in the range from 80 to 750 nm.

Inventive electrical cells are notable for particularly high capacities, high performance even after repeated charging, and significantly delayed cell death. Inventive electrical cells are very suitable for use in automobiles, aircraft, bicycles operated by electric motor, for example pedelecs, ships or stationary energy stores. Such uses form a further part of the subject matter of the present invention.

The present invention further provides a polymer comprising polymer chains which are formed from substituted and/or unsubstituted, preferably substituted, ethylene glycol units as monomer units, where more than 95% of these monomer units, up to a maximum of 100%, correspond to a monomer unit -M1'- which represents a substituted ethylene glycol unit of the formula (III') and/or of the formula (IV')

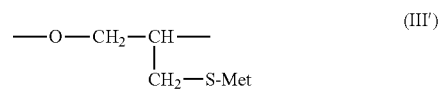
(III')

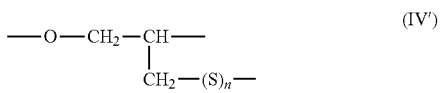
(IV')

in which Met is H, Li, Na or $Zn_{1/2}$, preferably H or Li, especially Li, and n is the same or different and is an integer from 1 to 4, preferably 1 or 2, especially 1, and two monomer units -M1'- of the formula (IV') may be joined to one another via a disulfide or polysulfide bridge $—(S)_n—(S)_n—$, especially a disulfide bridge, where these two monomer units -M1'- of the formula (IV') are present either in the same polymer chain or in two different polymer chains.

The inventive polymer consists to an extent of more than 50% by weight, preferably more than 80% by weight, especially to an extent of more than 95% by weight to a maximum of 100% by weight, of above-described polymer chains which are formed to an extent of more than 95% up to a maximum of 100% from monomer units of the formula (III') and/or of the formula (IV').

The inventive polymer is outstandingly suitable as polymer (A) in the above-described inventive electrode material for electrical cells.

The present invention further provides a process for preparing a polymer comprising polymer chains which are formed from substituted and/or unsubstituted ethylene glycol units as monomer units, where more than 95% of these monomer units, up to a maximum of 100%, correspond to a monomer unit -M1'- which represents a substituted ethylene glycol unit of the formula (III') and/or of the formula (IV'), preferably of the formula (IV'),

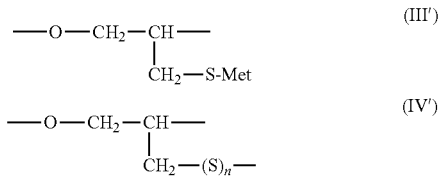
(III')

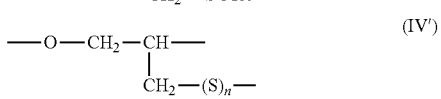
(IV')

in which Met is H, Li, Na or $Zn_{1/2}$, preferably H or Li, especially Li, and n is the same or different and is an integer from 1 to 4, preferably 1 or 2, especially 1, and two monomer units -M1'- of the formula (IV') may be joined to one another via a disulfide or polysulfide bridge $—(S)_n—(S)_n—$, especially a disulfide bridge, where these two monomer units -M1'- of the formula (IV') are present either in the same polymer chain or in two different polymer chains, comprising the reaction steps of:

a) reacting a linear polyepichlorohydrin of the formula (V),

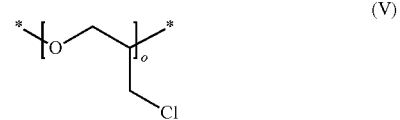
(V)

having a molecular weight $M_w$ of 100 000 g/mol to 3 000 000 g/mol with thiourea in the presence of a strong aqueous protic acid and of a polar aprotic solvent at a temperature of more than 100° C. and a pressure of more than 1 atm to form a polymer comprising monomer units having isothiuronium salt groups of the formula (VI),

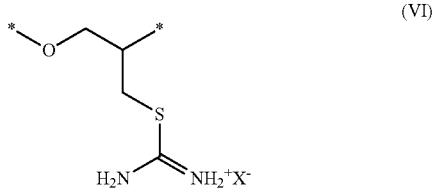

where X⁻ is Cl⁻ or the anion of the strong protic acid, and optionally comprising monomer units having thiol groups of the formula (III') where Met is H;

b) optionally reacting the polymer which comprises monomer units having isothiuronium salt groups of the formula (VI) and is obtained in process step a) with aqueous base in the presence of a phase transfer catalyst to eliminate urea and form a polymer comprising substituted ethylene glycol units of the formula (III') where Met is H;

c) optionally reacting the polymer obtained in process step b) with an oxidizing agent to form a polymer comprising substituted ethylene glycol units of the formula (IV') where n is 1, where two ethylene glycol units of the formula (IV') are joined to one another in each case via a disulfide bridge —S$_2$—, where these two ethylene glycol units of the formula (IV') are either in the same polymer chain or in two different polymer chains; and d) optionally reacting the polymer obtained in process step c) with elemental sulfur to form a polymer which comprises polysulfide bridges and comprises substituted ethylene glycol units of the formula (IV'), where two ethylene glycol units of the formula (IV') in each case are joined to one another via a polysulfide bridge —(S)$_n$—(S)$_n$—, where n+n is an integer from 3 to 8, and the two ethylene glycol units of the formula (IV') are either in the same polymer chain or in two different polymer chains.

The linear polyepichlorohydrins used in process step a), which have a molecular weight $M_w$ of 100 000 g/mol to 3 000 000 g/mol, are known to those skilled in the art and can be purchased commercially. The mean degree of polymerization o in formula (V) for these polymers accordingly ranges from about 1000 to about 33 000.

In process step a) of the process according to the invention, the strong aqueous protic acids used may, for example, be hydrochloric acid, sulfuric acid, hydrobromic acid or perchloric acid. Particular preference is given to using hydrochloric acid as the strong aqueous protic acid.

The polar aprotic solvent which can be used in process step a) of the process according to the invention is, for example, dimethylformamide, N-methyl-2-pyrrolidone, dimethyl sulfoxide, diethyl carbonate or tetramethylurea. More preferably, the polar aprotic solvent used is dimethylformamide.

The thiourea is typically used at least in stoichiometric amounts based on the number of the chlorine atoms to be substituted. The ratio of thiourea to the chlorine atoms to be substituted is preferably at least 2 to 1, more preferably at least 4 to 1. Typically, the ratio of thiourea to the chlorine atoms to be substituted is not more than 10 to 1, preferably not more than 8 to 1, especially not more than 6 to 1.

Process step a) of the process according to the invention is performed at a temperature of more than 100° C. and a pressure of more than 1 atm. Typically, process step a) of the process according to the invention is performed at a temperature of not more than 250° C. Preferably the reaction in process step a) is performed in a pressure vessel at a temperature between 140 and 160° C.

The reaction time in process step a) depends typically on the reaction temperature and the desired conversion of the reaction. The reaction is preferably performed for a period of 1 day to 5 days.

In the process according to the invention, in process step b), the polymer which comprises monomer units having isothiuronium salt groups of the formula (VI) and is obtained in process step a) is optionally reacted with aqueous base in the presence of a phase transfer catalyst to eliminate urea and form a polymer comprising substituted ethylene glycol units of the formula (III') where Met is H.

The aqueous bases used are preferably aqueous solutions of alkali metal hydroxides or alkaline earth metal hydroxides, especially of alkali metal hydroxides.

Phase transfer catalysts are common knowledge to the person skilled in the art. In process step b) of the process according to the invention, preference is given to using tetraalkylammonium salts, especially tetraalkylammonium halides, as phase transfer catalysts.

In a preferred embodiment, in process step b), the polymer from process step a) is reacted with aqueous sodium hydroxide solution in the presence of catalytic amounts of tetrabutylammonium iodide.

In process step b), the reaction is preferably performed within a temperature range from 50 to 100° C.

In the process according to the invention, in process step c), the polymer obtained in process step b) is optionally reacted with an oxidizing agent to form a polymer comprising substituted ethylene glycol units of the formula (IV') where n is 1, where two ethylene glycol units of the formula (IV') are joined to one another in each case via a disulfide bridge —S$_2$—, where these two ethylene glycol units of the formula (IV') are either in the same polymer chain or in two different polymer chains.

For the oxidative coupling of two thiol groups —SH to give a disulfide bridge —S—S—, it is possible in principle to use all oxidizing agents known to those skilled in the art. Examples of such oxidizing agents are, for example, iodine, bromine, p-benzoquinone, iron(III) chloride or potassium hexacyanoferrate(III). Particular preference is given to using iodine as the oxidizing agent in process step c).

In process step d) of the process according to the invention, the polymer obtained in process step c) is optionally reacted with elemental sulfur to form a polymer which comprises polysulfide bridges and comprises substituted ethylene glycol units of the formula (IV'), where two ethylene glycol units of the formula (IV') in each case are joined to one another via a polysulfide bridge —(S)$_n$—(S)$_n$—, where n+n is an integer from 3 to 8, and the two ethylene glycol units of the formula (IV') are either in the same polymer chain or in two different polymer chains.

In process step d), the reaction of the polymer obtained in process step c) with elemental sulfur is preferably performed at temperatures above the melting point of sulfur (β-S$_8$: 119.6° C.), more preferably within a temperature range from 150 to 170° C.

The inventive electrode material allows the production of electrical cells with a high specific capacity, especially with addition of elemental sulfur (component (C)), while simultaneously achieving an increased lifetime, especially also at temperatures below 30° C.

The invention is illustrated by the examples which follow, but which do not restrict the invention.

Figures in % relate to percentage by weight, unless explicitly stated otherwise.

I. Synthesis of Sulfur-Containing Polymers

I.1 Synthesis of Sulfur-Containing Polymer P1

I.1.a Synthesis of a Polyisothiuronium Salt 5 g of polyepichlorohydrin ($M_w$=700 000 g/mol, commercially available from Aldrich) were dissolved in 100 ml of DMF overnight with the aid of a shaker. Subsequently, thiourea (21 g, 270 mmol) was likewise dissolved in DMF (50 ml) in a pressure tube and admixed with the polymer solution and hydrochloric acid (2 M, 15 ml). The viscous mixture obtained was heated to 150° C. for 48 h, in the course of which the formation of a colorless precipitate was observed. After cooling, the pressure tube was opened cautiously. The solid formed was filtered off and washed with water (200 ml), hydrochloric acid (2 M, 100 ml) and water (200 ml). The water-containing solid was frozen at −30° C. and dried on a freeze drier for 48 h. 5.3 g of a colorless powder were isolated. The characterization was effected by means of elemental analysis and ATR-IR.

IR (neat): 2914m, 2867m, 2054w, 1652w, 1461w, 1409w, 1342w, 1093s, 561m $cm^{-1}$.

Elemental analysis:

|  | Calculated as isothiuronium salt | Found |
|---|---|---|
| Nitrogen | 16.61% | 1.14% |
| Carbon | 28.49% | 39.91% |
| Hydrogen | 5.38% | 6.47% |
| Sulfur | 19.01% | 34.26% |

I.1.b Synthesis of a Polymer P1 Comprising Polydisulfide Bridges 5.18 g of the sulfur-containing polymer from stage 1.1.a were initially charged with 311 mg of tetrabutylammonium iodide (catalytic amount) in a round-bottomed flask, benzene (110 ml) and sodium hydroxide solution (6.7 g, 168 mmol, 27 ml of water) were added, and the mixture was heated to reflux for 48 h, in the course of which a homogeneous solution was generally observed only after a prolonged period. After cooling, a few iodine crystals were added (until the violet color no longer disappeared) and the mixture was stirred at RT for 1 h. In order to accelerate precipitate formation, the solution was acidified with hydrochloric acid (2 M). The precipitate was filtered off and washed with EtOH (100 ml), water (200 ml), hydrochloric acid (2 M, 100 ml) and water (200 ml). The water-containing solid was frozen at −30° C. and dried on a freeze drier for 48 h. 2.5 g of a colorless solid (P1) were isolated. The characterization was effected by means of elemental analysis and ATR-IR.

IR (neat): 2911m, 2862m, 1053s, 561m $cm^{-1}$.
Elemental analysis

|  | Calculated as disulfide | Found |
|---|---|---|
| Nitrogen | 0.00% | 0.23% |
| Carbon | 40.42% | 29.57% |
| Hydrogen | 5.65% | 5.10 |
| Sulfur | 35.97% | 23.15% |

II. Production of Electrode Material and Electrodes

II.1 Processing of P1 to Give an Inventive Cathode K1

2.3 g of polymer P1 were homogenized thoroughly with 2.3 g of elemental sulfur in a mortar to obtain the polymer-sulfur mixture P1-S-1.

In a laboratory glass bottle, a solution of 0.25 g of polyvinyl alcohol in 82 g of a water-isopropanol mixture (weight ratio 65:35) was prepared. To produce the ink, 4.4 g of the polymer-sulfur mixture P1-S-1, 1 g of carbon black 1 (Ketjen®, BET surface area: 900 $m^2$/g (measured to ISO 9277), mean particle diameter: 10 μm) and 1 g of carbon black 2 (commercially available as Printex®, BET surface area: 100 $m^2$/g (measured to ISO 9277), mean particle diameter: 10 μm) were then added and the mixture was stirred. For dispersion, the mixture was transferred to a stainless steel milling vessel and then a ball mill (Pulverisette 6 from Fritsch) was used, stirring with stainless steel balls at 300 rpm for 30 min. The dispersion formed a very homogeneous ink with creamy consistency. The ink was sprayed by means of an airbrush method onto aluminum foil (thickness: 30 μm) on a vacuum table (temperature: 75° C.). Nitrogen was used for spraying. A solids loading of 4 mg/$cm^2$ was achieved. Thereafter, the aluminum foil coated on one side was cautiously laminated between two rubber rollers. A low applied pressure was selected, in order that the coating remained porous. Subsequently, the aluminum foil coated on one side was treated thermally in a drying cabinet at a temperature of 40° C.

III. Testing of the Cathodes in Electrochemical Cells

For the electrochemical characterization of the inventive electrode material produced from inventive polymer P1 and of the cathode K1 produced therefrom, electrochemical cells according to FIG. 1 were constructed. For this purpose, as well as the cathodes produced in II., the following components were used in each case:

Anode: Li foil, thickness 50 μm,
Separator: Polyethylene film, porous membrane of thickness 15 μm
Cathode: according to example II.
Electrolyte: 8% by weight of LiTFSI (LiN($SO_2CF_3$)$_2$), 46% by weight of 1,3-dioxolane and 46% by weight of 1,2-dimethoxyethane FIG. 1 shows the schematic structure of a dismantled electrochemical cell for testing of inventive electrode materials.

The annotations in FIG. 1 mean:
1, 1' die
2, 2' nut
3, 3' sealing ring —two in each case; the second, somewhat smaller sealing ring in each case is not shown here
4 spiral spring
5 output conductor made from nickel
6 housing The inventive electrochemical cell exhibited an open circuit potential of 2.45 volts. During the discharge (C/5), the cell potential fell to 2.2 to 2.3 volts (1$^{st}$ plateau) and then to 2.0 to 2.1 volts (2$^{nd}$ plateau). The cell was discharged down to 1.8 V and then charged. During the charging operation, the cell potential rose to 2.2 volts, and the cell was charged until 2.5 volts were attained. This was followed by a one-hour charging step at 2.5 volts. Then the discharge operation began again. The inventive electrochemical cell produced attained more than 30 cycles with only a very small loss of capacity.

The invention claimed is:
1. An electrode material for an electrical cell, comprising
 (A) polymer comprising polymer chains which are formed from identical or different monomer units selected from the group consisting of substituted and unsubstituted vinyl units and substituted and unsubstituted $C_2$-$C_{10}$-alkylene glycol units and comprise at least one monomer unit -M1- which comprises at least one thiolate group —$S^-$ or at least one end of a disulfide or polysulfide bridge —(S)$_m$— in which m is an integer from 2 to 8, the thiolate group or the one end of the disulfide or polysul- fide bridge —$(S)_m$— in each case being bonded directly to a carbon atom of the monomer unit -M1-, (B) carbon in a polymorph comprising at least 60% $sp^2$-hybridized carbon atoms, (C) optionally elemental sulfur, and (D) optionally at least one further polymer as a binder material.

2. The electrode material according to claim 1, wherein at least 60% of the monomer units from which the polymer chains of polymer (A) are formed correspond to the monomer unit -M1-.

3. The electrode material according to claim 1, wherein the monomer unit -M1- in the polymer chains of polymer (A) is a substituted vinyl unit of the formula (I) and/or of the formula (II)

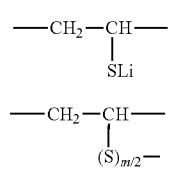

(I)

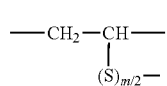

(II)

or a substituted ethylene glycol unit of the formula (III) and/or of the formula (IV)

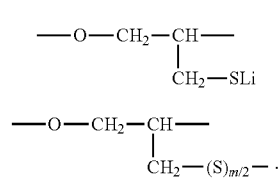

(III)

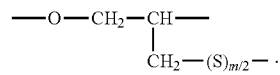

(IV)

4. The electrode material according to claim 1, which comprises at least one end of a disulfide or polysulfide bridge —$(S)_m$—, wherein a second end of said di- or polysulfide bridge —$(S)_m$— is part of a further monomer unit -M1- which is present either in the same polymer chain as the first monomer unit -M1- or in a further polymer chain of polymer (A).

5. The electrode material according to claim 1, wherein carbon (B) is selected from carbon black.

6. The electrode material according to claim 1, which comprises elemental sulfur (C), wherein a mass ratio between polymer (A) and the elemental sulfur (C) is in the range from 1:100 to 100:1.

7. An electrical cell comprising at least one electrode which has been produced from or using an electrode material according to claim 1.

8. The electrical cell according to claim 7, which further comprises at least one electrode comprising metallic lithium.

9. The electrical cell according to claim 7, which comprises a liquid electrolyte comprising a lithium-containing conductive salt.

10. The electrical cell according to claim 7, which comprises at least one nonaqueous solvent selected from the group consisting of polymers, cyclic and noncyclic ethers, noncyclic and cyclic acetals and cyclic and noncyclic organic carbonates.

11. A polymer comprising polymer chains which are formed from substituted and/or unsubstituted ethylene glycol units as monomer units, where more than 95% of these monomer units correspond to a monomer unit -M1'- which represents a substituted ethylene glycol unit of the formula (III') and/or of the formula (IV')

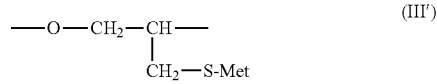

(III')

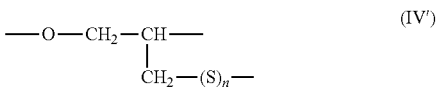

(IV')

in which Met is H, Li, Na or $Zn_{1/2}$ and n is the same or different and is an integer from 1 to 4, and two monomer units -M1'- of the formula (IV') may be joined to one another via a disulfide or polysulfide bridge —$(S)_n$—$(S)_n$—, where these two monomer units -M1'- of the formula (IV') are present either in the same polymer chain or in two different polymer chains.

12. A process for preparing a polymer comprising polymer chains which are formed from substituted and/or unsubstituted ethylene glycol units as monomer units, where more than 95% of these monomer units correspond to a monomer unit -M1'- which represents a substituted ethylene glycol unit of the formula (III') and/or of the formula (IV')

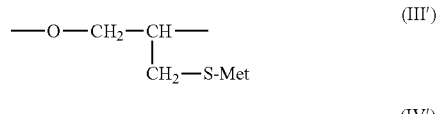

(III')

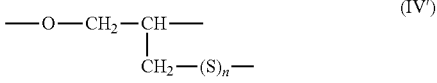

(IV')

in which Met is H, Li, Na or $Zn_{1/2}$ and n is the same or different and is an integer from 1 to 4, and two monomer units -M1'- of the formula (IV') may be joined to one another via a disulfide or polysulfide bridge —$(S)_n$—$(S)_n$—, where these two monomer units -M1'- of the formula (IV') are present either in the same polymer chain or in two different polymer chains, comprising the reaction steps of:

a) reacting a linear polyepichlorohydrin of the formula (V),

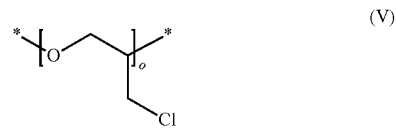

(V)

having a molecular weight $M_w$, of 100 000 g/mol to 3 000 000 g/mol with thiourea in the presence of a strong aqueous protic acid and of a polar aprotic solvent at a temperature of more than 100° C. and a pressure of more than 1 atm to form a polymer comprising monomer units having isothiuronium salt groups of the formula (VI),

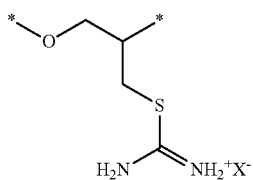

where X⁻ is Cl⁻ or the anion of the strong protic acid, and optionally comprising monomer units having thiol groups of the formula (III') where Met is H;

b) optionally reacting the polymer which comprises monomer units having isothiuronium salt groups of the formula (VI) and is obtained in process step a) with aqueous base in the presence of a phase transfer catalyst to eliminate urea and form a polymer comprising substituted ethylene glycol units of the formula (III') where Met is H;

c) optionally reacting the polymer obtained in process step b) with an oxidizing agent to form a polymer comprising substituted ethylene glycol units of the formula (IV') where n is 1, where two ethylene glycol units of the formula (IV') are joined to one another in each case via a disulfide bridge —S$_2$—, where these two ethylene glycol units of the formula (IV') are either in the same polymer chain or in two different polymer chains; and d) optionally reacting the polymer obtained in process step c) with elemental sulfur to form a polymer which comprises polysulfide bridges and comprises substituted ethylene glycol units of the formula (IV'), where two ethylene glycol units of the formula (IV') in each case are joined to one another via a polysulfide bridge —(S)$_n$—(S)$_n$—, where n+n is an integer from 3 to 8, and the two ethylene glycol units of the formula (IV') are either in the same polymer chain or in two different polymer chains.

13. The process according to claim 12, wherein a linear polyepichlorohydrin with a molecular weight M$_w$ of 400 000 g/mol to 1 000 000 g/mol is used in process step a).

14. The process according to claim 12, wherein the reaction in process step a) is performed in a pressure vessel at a temperature between 140 and 160° C.

15. A method of storing electrical energy comprising charging an electrical cell according to claim 7 with electrical energy, wherein said electrical cell is located in a device selected from the group consisting of an automobile, a bicycle operated by electric motor, an aircraft, a ship or a stationary energy store.

* * * * *